(12) United States Patent
Bhave et al.

(10) Patent No.: US 12,386,964 B2
(45) Date of Patent: *Aug. 12, 2025

(54) MULTI-STEP APPROACH FOR RANSOMWARE DETECTION

(71) Applicant: Druva Inc., Santa Clara, CA (US)

(72) Inventors: Adwait Bhave, Pune (IN); Hemanshu Asolia, Pune (IN); Neeraj Thakur, Pune (IN)

(73) Assignee: Druva Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/613,112

(22) Filed: Mar. 22, 2024

(65) Prior Publication Data

US 2024/0232357 A1 Jul. 11, 2024

Related U.S. Application Data

(63) Continuation of application No. 15/961,230, filed on Apr. 24, 2018, now Pat. No. 11,960,603.

(30) Foreign Application Priority Data

Apr. 25, 2017 (IN) .............................. 201741014571

(51) Int. Cl.
  *H04L 9/00* (2022.01)
  *G06F 21/55* (2013.01)
  *G06F 21/56* (2013.01)

(52) U.S. Cl.
  CPC .......... *G06F 21/566* (2013.01); *G06F 21/552* (2013.01); *G06F 21/56* (2013.01); *G06F 2221/034* (2013.01)

(58) Field of Classification Search
  CPC ...... G06F 21/566; G06F 21/552; G06F 21/56; G06F 2221/034
  See application file for complete search history.

(56) References Cited

U.S. PATENT DOCUMENTS 10,055,582 B1 * 8/2018 Weaver ................. G06F 21/562
2008/0184367 A1 7/2008 McMillan et al.
(Continued)

FOREIGN PATENT DOCUMENTS

WO WO-2007022392 A2 * 2/2007 ........... G06F 21/554

OTHER PUBLICATIONS

European Patent Office, Intention to Grant, European Patent Application No. 18169123.9, Jul. 15, 2019, 39 pages.
(Continued)

*Primary Examiner* — Syed M Ahsan
(74) *Attorney, Agent, or Firm* — Fenwick & West LLP

(57) ABSTRACT

A server manager for detecting ransomware includes a server interface to retrieve, from a storage device, a backup of a plurality of files stored by a client device. A ransomware detection module includes a statistical filter to generate a standard pattern of file activities of the client device for a time period. A statistical behavior analysis is performed on the backup of the plurality of files based on the standard pattern to identify a portion of the backup corresponding to a statistical anomaly different from the standard pattern. The statistical anomaly corresponds to an abnormal file activity. An entropy detector generates an entropy score for the portion of the backup. The entropy score represents a randomness of a distribution of bits in a block of a file in the portion of the backup. It is determined whether the backup includes the ransomware based on the generated entropy score.

20 Claims, 7 Drawing Sheets

(56) References Cited

U.S. PATENT DOCUMENTS

2015/0278031 A1* 10/2015 Rattner .............. G06F 11/1464
707/654
2017/0180394 A1  6/2017 Crofton et al.
2017/0223031 A1*  8/2017 Gu .................... G06F 11/1448
2017/0359370 A1 12/2017 Humphries et al.
2018/0173874 A1*  6/2018 Muttik .................. G06F 21/57

OTHER PUBLICATIONS

Extended European Search Report, European Patent Application No. 18169123.9, Sep. 7, 2018, 8 pages.

* cited by examiner

MULTI-STEP APPROACH FOR RANSOMWARE DETECTION

CROSS REFERENCE TO RELATED APPLICATIONS

This application is a continuation of Ser. No. 15/961,230, filed Apr. 24, 2018, which claims a benefit of, and priority to, India Provisional Patent Application No. 201741014571, filed Apr. 25, 2017, the contents of which are incorporated by reference in their entirety.

FIELD

The disclosure generally relates to the field of data storage, and in particular to, detecting ransomwares in back-up storage.

BACKGROUND

As an amount of electronic files and digital content shared by client devices (e.g., desktop computers, server computers, laptops, smartphones, or tablet computers) increases, the risk of ransomware attack increases. For example, user data (e.g., personal information or passwords) can be easily compromised through standard programming languages and system commands, and some ransomwares can damage content stored by a client device based on the user data. In particular, certain files may be deleted, modified, or added to degrade performance of the client device.

One approach of repairing damages due to ransomware involves screening each file stored by a client device individually. However, an increase in the amount of data stored by the client device (e.g., more than hundreds of Gigabytes or Terabytes) results in an increased amount of resource (e.g., processor threads, and time) of the client device to examine each file.

In another approach, a heuristic pattern analysis may be performed by a client device. In particular, a pattern of file activities (e.g., delete, modify, add, etc.) may be analyzed to help identify any unusual pattern of file activities. However, such heuristic pattern analysis may be insufficient to detect a particular ransomware and to determine exact damage caused by the ransomware. Moreover, heuristic pattern analysis is computationally expensive and substantially adds to the resource consumption of the client device, thereby deteriorating the user experience.

Accordingly, there is a lack of an efficient approach of detecting ransomware and resolving damages due to the ransomware.

DETAILED DESCRIPTION

Figure 1:
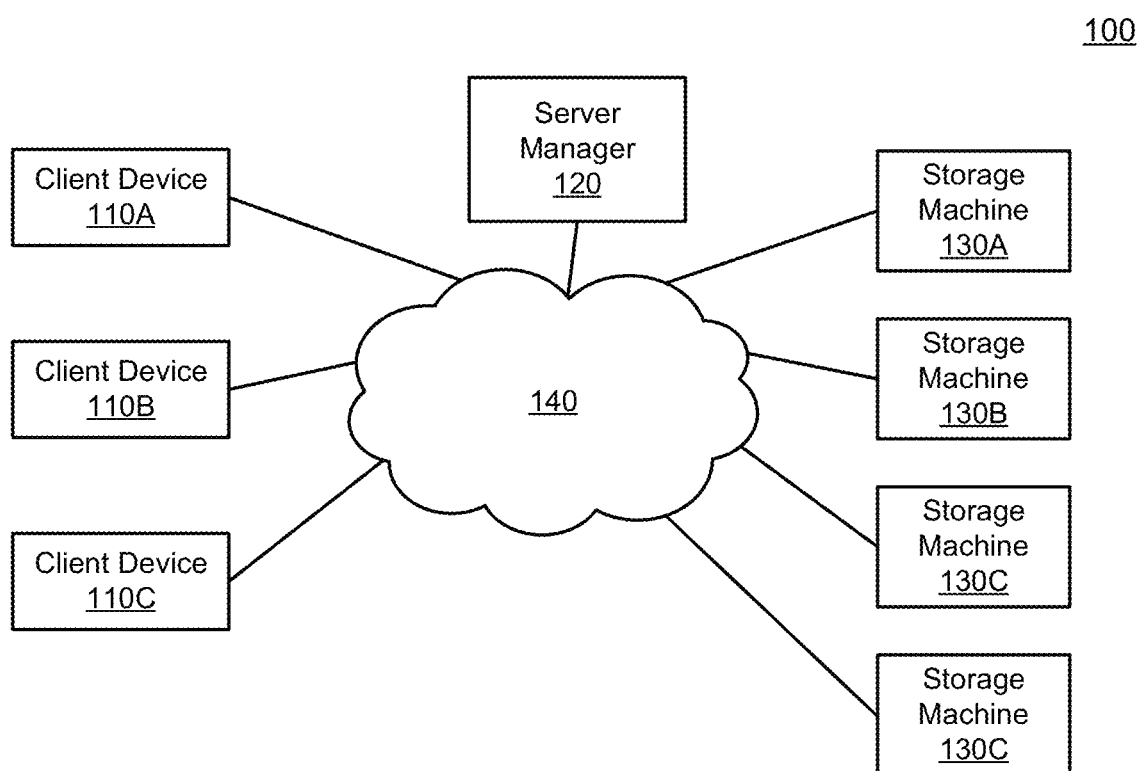
FIG. 1 illustrates a storage environment, respectively, in accordance with an embodiment.

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed embodiments herein are related to a system, a method, and a non-transitory computer readable medium for detecting ransomware through a multistep approach, e.g., a two-step approach. The system includes a server manager for detecting ransomware, including a server interface to retrieve, from a storage device, a backup of a plurality of files stored by a client device. A ransomware detection module includes a statistical filter to generate a standard pattern of file activities of the client device for a time period. A statistical behavior analysis is performed on the backup of the plurality of files based on the standard pattern to identify a portion of the backup corresponding to a statistical anomaly different from the standard pattern. The statistical anomaly corresponds to an abnormal file activity. An entropy detector generates an entropy score for the portion of the backup. The entropy score represents a randomness of a distribution of bits in a block of a file in the portion of the backup. It is determined whether the backup includes the ransomware based on the generated entropy score. Information is transmitted describing whether the backup includes the ransomware for display on the client device.

In one aspect, data stored by a client device is backed up by a storage device. Content stored by the client device may be backed up by a number of backup cycles. The storage device identifies any potential ransomware in the backup through (i) a statistical behavior analysis to determine a portion (e.g., a backup cycle) of a backup with an abnormal file activity, and (ii) an entropy detection on the portion of the backup.

In one or more embodiments, a statistical behavior analysis is performed as a first step of a two-steps approach. The statistical behavior analysis is performed as a prescreening to identify a portion of the backup associated with an abnormal file activity. An abnormal file activity is referred to as a file activity deviating from a standard pattern of file activities associated with a client device 110. The standard pattern may be unique for each client device 110. A file activity is referred to as an activity executed on a client device for changing a status of one or more digital files. Examples of a file activity include creating, deleting, and modifying a digital file. A standard pattern of file activities for a time period or for a number of backup cycles may be determined through a statistical analysis, and the standard pattern is used to detect a portion of the backup with abnormal file activities.

In the second step of the two steps approach, an entropy detection is applied on the portion of the backup identified in the statistical behavior analysis to perform a deeper level search of possible ransomware. In one aspect, the entropy detection is performed to check any randomness in the distribution of bits for a given block of file, where a high randomness above a threshold in the distribution indicates a possible a ransomware.

Advantageously, the two steps approach disclosed herein allows savings in time and computing resources for detecting ransomware. In particular, performing the entropy detection on an entire backup may be computationally expensive. By performing the statistical behavior analysis on the backup to filter out portions of the backup with file activities similar to the specific pattern, the entropy detection can be performed for a much smaller portion of the backup flagged by the statistical behavior analysis. For example, rather than performing the entropy detection on millions of files, the entropy detection can be performed on a selective portion of the backup (e.g., less than one thousand files) with file activities deviating from the standard pattern. Moreover, by performing the statistical behavior analysis on the backup rather than on a client device, computation resources of the client device may be preserved.

System Overview

FIG. (Figure) 1 illustrates one embodiment of a storage environment 100, which comprises a server manager 120 that provides data storage services to client devices 110 over a network 140 through one or more storage machines 130 (also referred to as "servers 130"). Portions of a storage machine 130 may be implemented in software, hardware, or a combination thereof. For example, the storage machine 130 may be part of a PC, a tablet PC, an STB, a smartphone, an IoT appliance, or any machine capable of executing instructions that specify actions to be taken by that machine. The storage machine 130 may include one or more processing units (e.g., a CPU, a GPU, a DSP, a controller, a state machine, one or more ASICs, one or more RFICs, or any combination of these) and a memory.

A client device 110 may send a request to read, add, delete, or modify data to the server manager 120. Examples of data requested to be stored include, but are not limited to, a text file, an image file, a video clip, or any combination thereof. The client device 110 can be any computing device that has data that requires backup. Examples of such device include a personal computer (PC), a desktop computer, a notebook, a tablet computer, or any other suitable electronic device. Examples also include a device executing an operating system, for example, a MICROSOFT WINDOWS-compatible operating system (OS), APPLE OS X or iOS, GOOGLE ANDROID and/or a LINUX distribution. The client device 110 can also be any device having computer functionality, such as a personal digital assistant (PDA), a mobile telephone, a smartphone, a device executing the APPLE iOS operating system, the GOOGLE ANDROID operating system, WINDOWS MOBILE operating system, or WEBOS operating system. Computer functionality and structure are described further in conjunction with FIG. 7. The client device 110 may also be a server device that requires backup, such as a web server (running for example APACHE), a file server, a database server, etc. Although such server devices may perform server functions in an organization, from the point of view of the server manager 120, they are treated like any other client device that requires data backup services.

The server manager 120 is a hardware component (e.g., computing machine of FIG. 7) that enables the client device 110A to store data in one or more storage machines 130 and access the stored data. Parts of the server manager 120 may be implemented in software or hardware. For example, parts of the server manager 120 may be a PC, a tablet PC, an STB, a smartphone, an internet of things (IoT) appliance, or any machine capable of executing instructions that specify actions to be taken by that machine. Parts of the server manager 120 may include one or more processing units (e.g., a CPU, a GPU, a DSP, a controller, a state machine, one or more ASICs, one or more RFICs, or any combination of these) and a memory.

The server manager 120 includes a server interface (described in detail below with respect to FIG. 2) to retrieve, from a storage machine 130, a backup of a plurality of files stored by a client device 110. A ransomware detection module 230 (described in detail below with respect to FIG. 2) of the server manager 120 includes a statistical filtering module 320 (described in detail below with respect to FIG. 3) to generate a standard pattern of file activities of the client device 110 for a time period. A statistical behavior analysis is performed on the backup of the plurality of files based on the standard pattern to identify a portion of the backup corresponding to a statistical anomaly different from the standard pattern. The statistical anomaly corresponds to an abnormal file activity. An entropy detector (described in detail below with respect to FIG. 3) generates an entropy score for the portion of the backup. The entropy score represents a randomness of a distribution of bits in a block of a file in the portion of the backup. It is determined whether the backup includes the ransomware based on the generated entropy score. Information is transmitted describing whether the backup includes the ransomware for display on the client device 110.

The server manager 120 receives a request from the client device 110 to upload data for storage on the one or more storage machines 130, and then stores the requested data. Moreover, the server manager 120 retrieves data that has been stored previously on the one or more storage machines 130, in response to a request from the client device 110. The server manager 120 can determine a storage machine 130 associated with a user using a client device 110. In addition, the server manager 120 can determine to which storage machine 130 to store data or metadata. In one embodiment, the server manager 120 detects any ransomware in the data stored by the storage machine 130, and remedy any damages due to the ransomware, as further described in conjunction with FIGS. 2 through 6. In one embodiment, the server manager 120 may be implemented using one or more computer servers that have a network communications capability. In another embodiment, the server manager 120 is implemented using cloud services such as AMAZON WEB SERVICES or MICROSOFT AZURE.

The interactions among the client device 110, the server manager 120, and the one or more storage machines 130 are typically performed via a network 140, for example, via the internet. In one embodiment, the network 140 uses standard communications technologies and/or protocols. Thus, the network 140 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 140 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 140 can also include links to other networks such as the internet.

Example Server Manager

Figure 2:
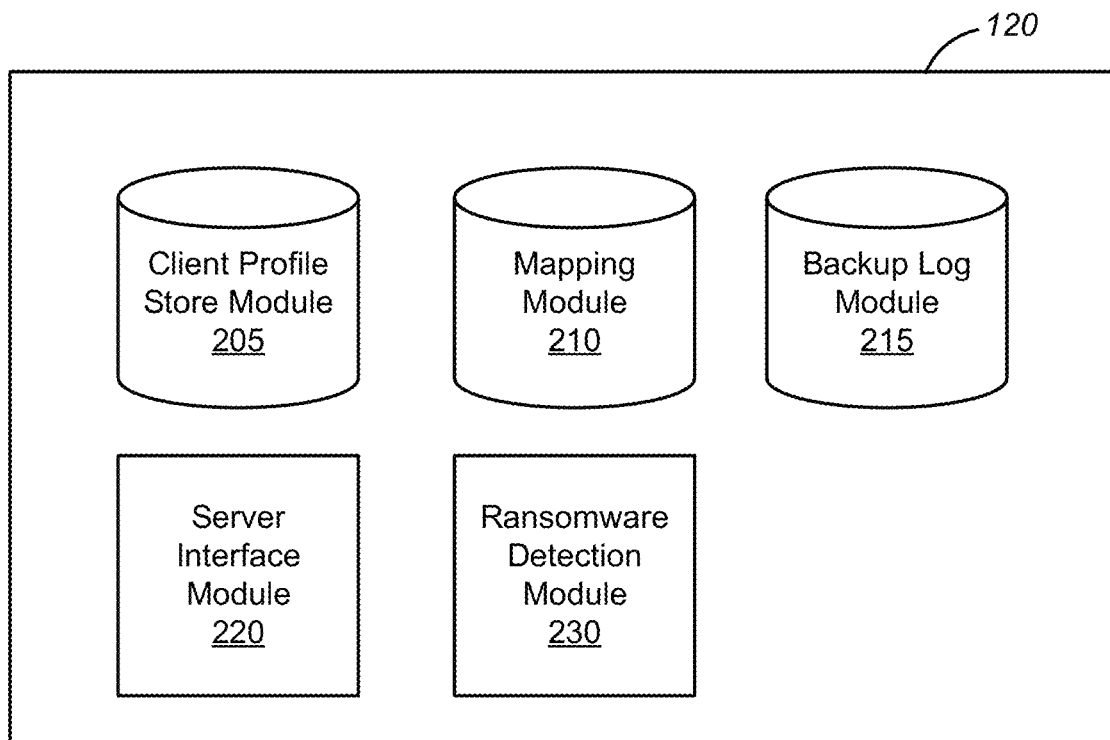
FIG. 2 illustrates a block diagram of a server manager in accordance with an embodiment.

FIG. 2 illustrates a block diagram of an embodiment of the server manager 120. The server manager 120 shown in FIG. 2 includes a client profile store module 205, a mapping module 210, a backup log module 215, a server interface module 220, and a ransomware detection module 230. In other embodiments, the server manager 120 may include additional, fewer, or different components for various applications.

The server interface module 220 receives requests from one or more client devices 110 and executes the requests. The server interface module 220 may be implemented in software, hardware, or a combination thereof. For example, the server interface module 220 may be part of a PC, a tablet PC, an STB, a smartphone, an IoT appliance, or any machine capable of executing instructions that specify actions to be taken by that machine. The server interface module 220 may include one or more processing units (e.g., a CPU, a GPU, a DSP, a controller, a state machine, one or more ASICs, one or more RFICs, or any combination of these) and a memory.

Specifically, the server interface module 220 receives a request to store input data from the client device 110, and stores the input data at one or more storage machines 130. In one embodiment, the server interface module 220 splits the data from the client device 110 into one or more partitions and distributes the partitions to one or more storage machines 130, according to the mapping module 210. Each partition may comprise one or more key-value pairs. Moreover, the server interface module 220 receives a request from the client device 110 to read (or access) data stored at one or more storage machines 130; retrieves partitions associated with the requested data from the one or more storage machines 130 based on the mapping module 210; combines the retrieved partitions; and provides the combined partitions to the client device 110. Furthermore, the server interface module 220 receives, from the client device 110, a request to add, delete, or modify a specific data file, and the server interface module 220 identifies partitions corresponding to the file and the client device 110 through the client profile store module 205 and the mapping module 210, and then executes the request. In one aspect, the client device 110 is neither aware of how the data is partitioned nor distributed, but rather recognizes the data is stored at a single storage machine 130.

The client profile store module 205 stores identifications of client devices 110 and identifications of one or more storage machines 130 associated with a client device 110. In one embodiment, the client profile store module 205 can be embodied as a look up table. The client device 110A may be associated with a plurality of storage machines 130, as shown in FIG. 1. Through the client profile store module 205, the server interface module 220 can identify one or more storage machines 130 associated with a client device 110.

The mapping module 210 stores information describing how data are partitioned and storage machines 130 associated with each partition. In one embodiment, the mapping module 210 can be embodied as a look up table. For example, a text document from the client device 110 can be split into multiple partitions, and each partition can be stored at different storage machines 130. Through the mapping module 210, the server interface module 220 can identify which data is associated with which partitions, and which storage machine the partitions are stored at. Although in FIG. 2 the client profile store module 205 and mapping module 210 are described as two separate modules, in other embodiments, the client profile store module 205 and the mapping module 210 may be combined into a single module.

The backup log module 215 records a history of file activities of backup. The backup log module 215 may be implemented in software, hardware, or a combination thereof. The backup log module 215 may include one or more processing units (e.g., a CPU, a GPU, a DSP, a controller, a state machine, one or more ASICs, one or more RFICs, or any combination of these) and a memory.

The backup log module 215 is communicatively coupled to the ransomware detection module 230 and stores file activities comprising addition, deletion, and modification of the plurality of files. The statistical filtering module 320 (described in detail below with respect to FIG. 3) is further configured to retrieve the file activities for generating the standard pattern of file activities. For example, the backup log module 215 records file activities (e.g., addition, deletion, modification) of files stored by one or more storage machines 130 for each backup cycle. History of file activities may be accessed by the server interface module 220 for restoring a particular backup cycle or the backup. Additionally, history of file activities may be accessed by the ransomware detection module 230 for detecting potential ransomwares.

The ransomware detection module 230 may be configured to perform ransomware detection through a multi-step approach, e.g., two steps approach. The ransomware detection module 230 may be implemented in software, hardware, or a combination thereof. For example, the ransomware detection module 230 may be part of a PC, a tablet PC, an STB, a smartphone, an IoT appliance, or any machine capable of executing instructions that specify actions to be taken by that machine. The ransomware detection module 230 may include one or more processing units (e.g., a CPU, a GPU, a DSP, a controller, a state machine, one or more ASICs, one or more RFICs, or any combination of these) and a memory.

In one example, the ransomware detection module 230 may be configured to perform a statistical behavior analysis as a first step of the two-steps approach, and performs an entropy detection as a second step of the two-steps approach.

The statistical behavior analysis is performed to identify a portion of the backup associated with a statistical anomaly. The entropy detection may be performed on the identified portion of the backup for a thorough review. Detailed process of ransomware detection is described in below with respected to FIGS. 3 through 6 below.

Example Ransomware Detection Module

Figure 3:
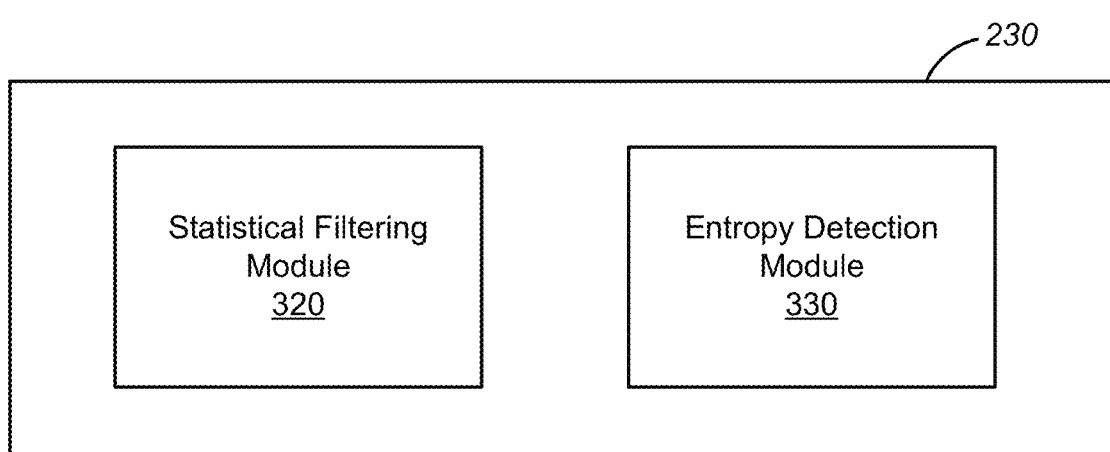
FIG. 3 illustrates a block diagram of a ransomware detection module in accordance with an embodiment.

FIG. 3 illustrates a block diagram of a ransomware detection module 230 in accordance with an example embodiment. In one example embodiment, the ransomware detection module 230 may include a statistical filtering module 320 and an entropy detection module 330. In other example embodiments, the ransomware detection module 230 may include additional, fewer, or different components for various applications.

The statistical filtering module 320 may be implemented in software, hardware, or a combination thereof. For example, the statistical filtering module 320 may be part of a PC, a tablet PC, an STB, a smartphone, an IoT appliance, or any machine capable of executing instructions that specify actions to be taken by that machine. The statistical filtering module 320 may include one or more processing units (e.g., a CPU, a GPU, a DSP, a controller, a state machine, one or more ASICs, one or more RFICs, or any combination of these) and a memory.

In one embodiment, the statistical filtering module 320 generates the standard pattern of file activities by analyzing file activities of the backup of the plurality of files stored by the client device 110 for the time period to generate a histogram. The statistical filtering module 320 generates the standard pattern of file activities based on the histogram. The standard pattern of file activities comprises at least a ratio of a number of the plurality of files modified to a total number of the plurality of files.

Figure 5A:
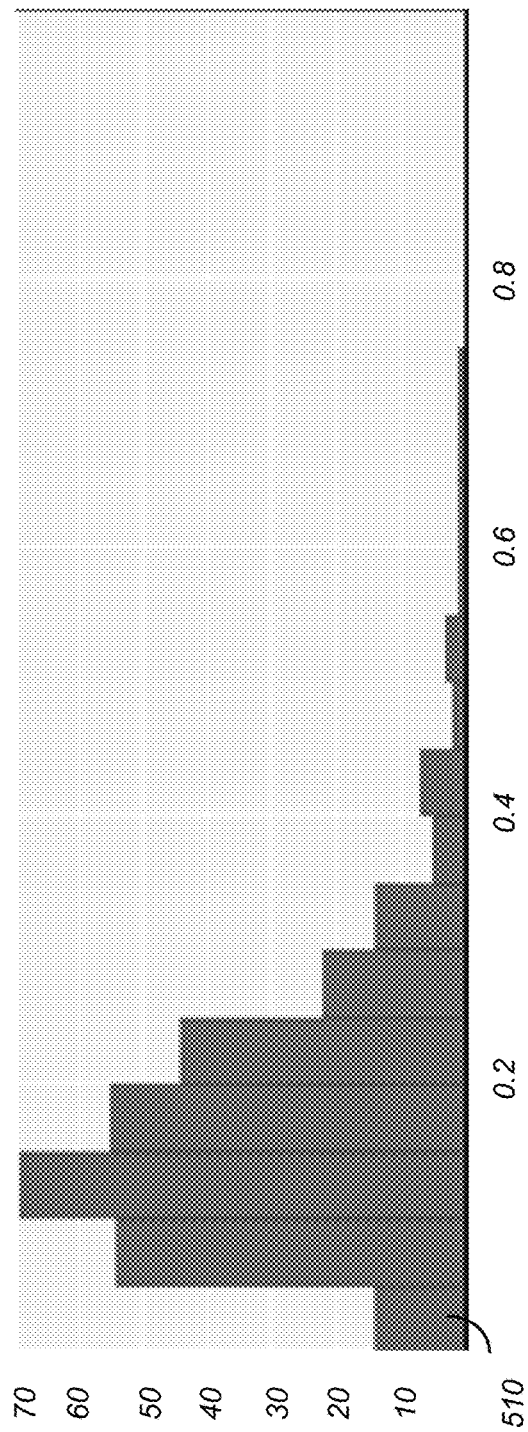
FIG. 5A is an example histogram for determining a standard pattern of file activities, in accordance with an embodiment.

The statistical filtering module 320 may be configured to detect a standard pattern of file activities for a certain time period. In one aspect, the statistical filtering module 320 analyzes file activities (e.g., addition, deletion, modification of files) of backup associated with a client device 110 for a given time period (e.g., last 33 backups), and generates a histogram (e.g., as shown in FIG. 5A) for determining a standard pattern of normal file activities (i.e., activities without ransomware). In one example implementation, determining a pattern of normal file activities may be performed as shown in Table 1.

TABLE 1

Learning Phase

For each datapoint in series:
Determine bin for the datapoint.
Map[bin] = count of points in bin +1

In one example, the statistical filtering module 320, for a number (e.g., 33) of backup cycles performed for a client device for various shares, obtains a number of files modified, a number of files removed, and a number of files added. Then, the statistical filtering module 320 obtains one or more datapoints for each backup cycle performed. For example, the statistical filtering module 320 obtains a ratio of files modified with respect to a total number of files in a backup cycle based on the number of files modified, a ratio of files added with respect to a total number of files in the backup cycle based on the number of files added, and a ratio of files removed with respect to a total number of files in the backup cycle based on the number of files removed, as datapoints for the backup cycle. Moreover, the statistical filtering module 320 generates a histogram based on datapoints of different backup cycles performed. A total number of bins in the histogram may be predetermined (e.g., total 20 bins, where each bin covers a range of 0.05).

Based on the standard pattern determined, the statistical filtering module 320 determines a portion of the backup that may be associated with a ransomware. In one embodiment, the statistical filtering module 320 identifies the portion of the backup corresponding to a statistical anomaly by generating an anomaly score that indicates a degree of anomalies of file activities for the portion of the backup. The statistical filtering module 320 determines that the portion of the backup corresponds to the statistical anomaly, responsive to the anomaly score exceeding a threshold.

In one aspect, a portion (e.g., a backup cycle) of the backup associated with the ransomware may be associated with statistical anomalies of file activities deviating from the standard pattern. The statistical filtering module 320 generates an anomaly score that indicates a degree of anomalies of file activities for the portion of the backup. In one approach, the anomaly score may be generated based on the histogram. In one implementation, detecting anomalies in file activities of a portion of backup can be performed as shown below in Table 2.

TABLE 2

Predict Anomaly

For each datapoint in series:
If datapoint is greater than MINIMUM_ALERT_THRESHOLD
  Determine bin for the datapoint
  Consider 1 bin on either side
  Anomaly score = 1 / (1+ count of points in bin and 2 bins on side)
If Anomaly score > ANOMALY_THRESHOLD
  Alert Anomaly In one embodiment, the statistical filtering module 320 identifies the portion of the backup corresponding to the statistical anomaly by generating a ratio of a number of file activities to a total number of the plurality of files. The statistical filtering module 320 determines that the portion of the backup corresponds to the statistical anomaly, responsive to the ratio exceeding a threshold.

For example, the statistical filtering module 320 detects for a backup cycle in the backup, whether a datapoint (e.g., a ratio of file activities such modification, addition, deletion, or a combination of them) with respect to a total number of files in the backup cycle, and determines whether the datapoint exceeds a threshold (e.g., MINIMUM_ALERT_THRESHOLD). The threshold may be predetermined and may be also configurable. If the datapoint is less than the threshold (e.g., less than 75%), the statistical filtering module 320 may examine another backup cycle or end the process. If the datapoint is larger than or equal to the threshold, then the statistical filtering module 320 obtains a number of counts in a bin associated with the datapoint, and numbers of counts in adjacent bins. Moreover, the statistical filtering module 320 may obtain an anomaly score based on the number of counts in the bin associated with the datapoint, and the numbers of counts in the adjacent bins. For example, the anomaly score may be inverse proportional to a sum of the number of counts in the bin associated with the datapoint, and the numbers of counts in the adjacent bins. '1' may be added to the sum of the number of counts in the bin associated with the datapoint, and the numbers of counts in the adjacent bins to avoid a computational error when the sum is 0. If the anomaly score is larger than an anomaly threshold (e.g., ANOMALY_THRESHOLD), then the backup cycle is flagged as possible infection by a ransomware.

The entropy detection module 330 performs a more rigorous analysis on a portion of the backup indicated by the statistical filtering module 320. The entropy detection module 330 may be implemented in software, hardware, or a combination thereof. For example, the entropy detection module 330 may be part of a PC, a tablet PC, an STB, a smartphone, an IoT appliance, or any machine capable of executing instructions that specify actions to be taken by that machine. The entropy detection module 330 may include one or more processing units (e.g., a CPU, a GPU, a DSP, a controller, a state machine, one or more ASICs, one or more RFICs, or any combination of these) and a memory.

The entropy of a file refers to a measurement of randomness in a given set of values (data) in the file. For example, an entropy value of a file may lie between 0 and 8. The closer the number is to zero, the more orderly or non-random the data is, e.g., typical text. A higher entropy value may indicate file compression or encryption.

In one embodiment, the entropy detection module 330 generates the entropy score restoring the block of the file in the portion of the backup. The entropy detection module 330 obtains the entropy score for the block of the file. If an anomaly corresponding to a large number of file activities (e.g., addition, removal, modification) is flagged in a portion of the backup, the entropy detection module 330 performs a journal walk (i.e., restoring one or more backup cycles) to identify files updated or added in the given restore point. For each file object found, the entropy detection module 330 restores a block (e.g., 1 Kilobytes) of file, and obtains an entropy of the block to determine whether the block may include ransomwares. Entropy represents a randomness of distribution of bits for a given block of file. Ransomware using block cipher algorithms results in uniform distribution of byte octets (0, 255) with a higher entropy compared to general application file formats having a higher density of ASCII and text separators.

In one embodiment, determining whether the backup includes the ransomware comprises determining whether the backup includes the ransomware, responsive to the entropy score of the block of the file exceeding a threshold entropy value, and MIME information for the file changing from an initial value. The entropy detection module 330 compares an entropy of a block of file with a threshold entropy value. The entropy may be larger than a threshold entropy value. The entropy detection module 330 may also determine an initial value of MIME information for the file. If the MIME information of the file has later changed from the initial value, the entropy detection module 330 determines that the file is encrypted and the client device may be infected with a ransomware. The threshold value may be predetermined, and may be varied according to a type of the file (text document, image file, etc.). In one implementation, a Shannon Entropy can be computed as below according to Equation (1).

$$S = \sum_{i=0}^{255} P_i \log_2 P_i, \, P_i = C_i / len \qquad \text{Eq. (1)}$$

where S is the Shannon Entropy number between [0, 8], and $C_i$ is the number of occurrence of the byte in length len of data.

Multipurpose Internet Mail Extensions (MIME) is a standard that extends the format of e-mail to support text in character sets other than ASCII; non-text attachments such as audio, video, images, and application programs; header information in non-ASCII character sets, etc. The content types defined by MIME standards may also be used in communication protocols outside e-mail, such as HTTP. For example, a server may insert a MIME header at the beginning of a web transmission. A client may then use this content type or media type header to select an appropriate viewer application for the type of data the header indicates. For example, the MIME information for a file may include any or all of the following: MIME-Version: 1.0; Content-Type: multipart/mixed; boundary="XXXXboundary text"; This is a multipart message in MIME format. --XXXX-boundary text; Content-Type: text/plain.

The entropy detection module 330 may determine that MIME information for the file has changed from an initial value. The entropy detection module 330 may use the change in MIME information of the file to determine that the file is encrypted and the client device may be infected with ransomware. The change of MIME information may indicate hacking or presence of ransomware.

Example Process for Detecting Ransomware

Figure 4:
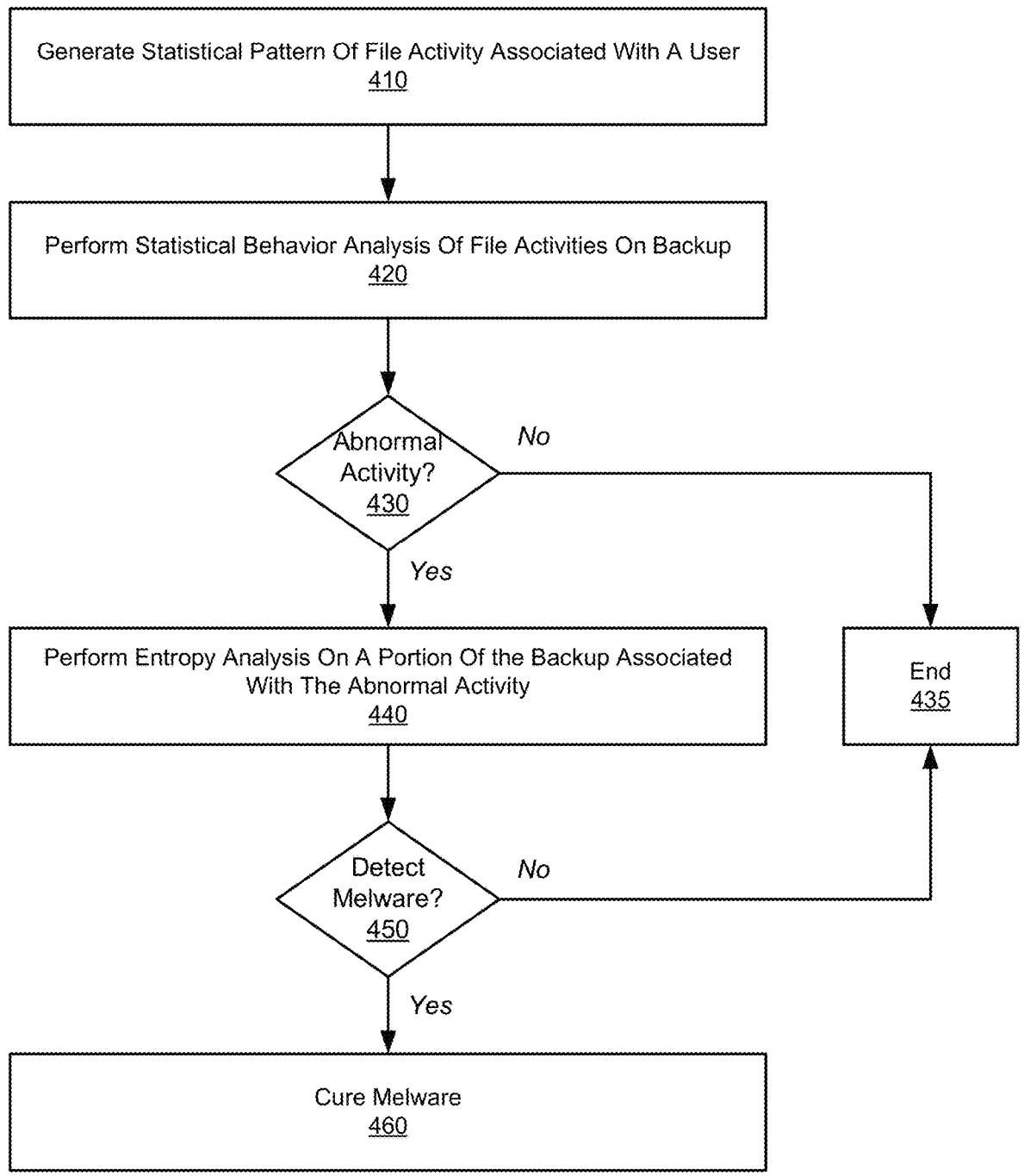
FIG. 4 is an example flow chart for detecting a ransomware through a two steps approach, in accordance with an embodiment.

Turning now to FIG. 4, it illustrates a flowchart of one embodiment of a method of detecting a ransomware on a backup storage through a two-steps approach by the server manager 120. In other embodiments, the method may include different and/or additional steps than those shown in FIG. 4. The functionality is described in conjunction with the server manager 120 in FIG. 4 and may be provided by the server interface module 220 of the server manager 120, in one example embodiment. Alternately, it may be provided by any other suitable component, or components, in other embodiments. Additionally, the client device 110 may execute one or more instructions associated with the server manager 120, such as an application associated with the server manager 120, to provide the functionality described in conjunction with FIG. 4.

For a first step of two step approaches, the server manager 120 generates 410 a statistical pattern of file activities associated with a user. The server manager 120 performs 420 a statistical behavior analysis of file activities for backup. The server manager 120 may generate a histogram of the file activities for the backup for a given time period to determine a standard pattern of file activities. The server manager 120 determines 430 whether a portion of the backup is associated with statistical anomalies based on the standard pattern. For example, the server manager 120 obtains an anomaly score indicating a degree of anomalies of file activities for the portion of the backup, and determines whether the anomaly score exceeds a threshold value. The threshold value may be determined based on the standard pattern. In response to the anomaly score being below the threshold value, the server manager 120 may end 435 the ransomware detection, or perform ransomware detection on other backup cycles. In response to the anomaly score exceeding the threshold value, the server manager 120 flags the portion of the backup for a further review.

For a second step of the two steps approach, the server manager 120 performs a deeper level review of the portion of the backup identified in the first step. In one approach, the server manager 120 performs 440 an entropy analysis on the portion of the backup. For example, the server manager 120 restores the portion of the backup, and obtains an entropy for the restored portion of the backup. The server manager 120 compares 450 the entropy with a threshold entropy value. If the entropy is larger than the threshold entropy value, and if there is a change in MIME information for the file, then the entropy detection module 330 determines that the file is (or includes) ransomware. In response to detecting the ransomware, the server manager 120 or other entities can perform an appropriate action to cure 460 the detected ransomware. If the ransomware is not detected, then the server manager 120 may perform ransomware detection on other backup cycles or terminate the process.

Example Histogram for Determining Standard Pattern of File Activities

FIG. 5A is an example histogram for determining a standard pattern of file activities, in accordance with an embodiment. In this example, X axis is a data point (e.g., a ratio of a particular file activity with respect to a total number of files in a backup cycle). Y axis is a frequency count for a range of ratio. For example, 15 backup cycles are identified in a first bin 510 associated with a range of ratio between 0.0 and 0.05. The histogram may be used to determine a standard pattern of file activities, and determine whether a portion (e.g., backup cycle) of a backup may be associated with abnormal file activities.

Example Time Series Plot of Ratio of File Activities

Figure 5B:
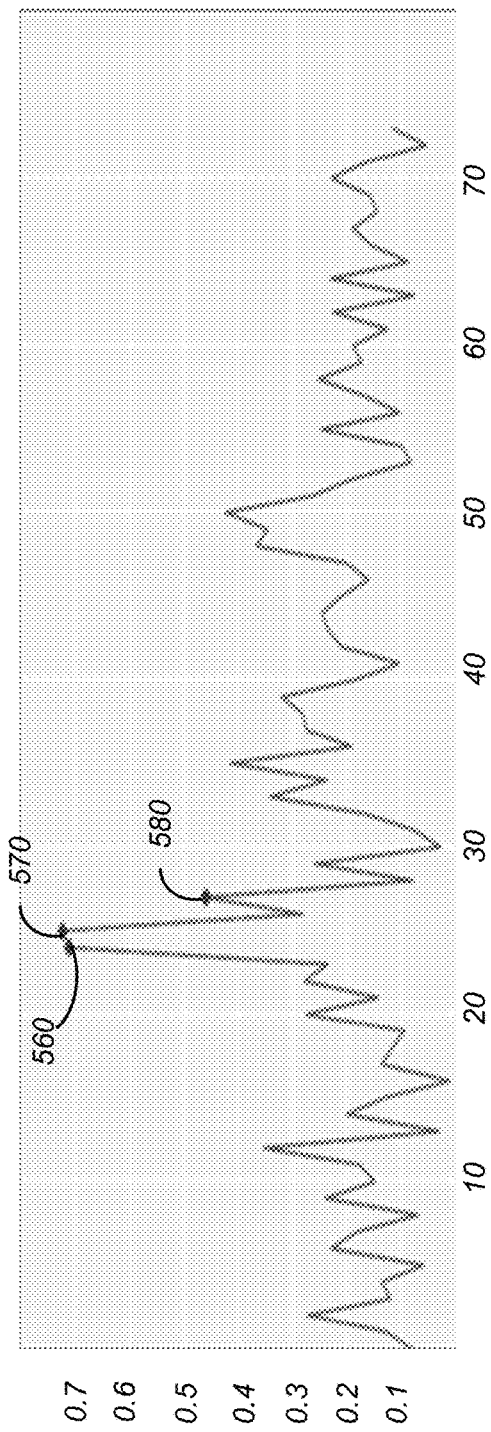
FIG. 5B is an example diagram of a time series plot of a ratio of file activities with respect to a total number of files in each backup cycle, in accordance with an embodiment.

FIG. 5B is an example diagram of a time series plot of datapoints, in accordance with an embodiment. In FIG. 5B, each of three backup cycles 560, 570, 580 out of 75 backup cycles has a datapoint (e.g., a ratio of file activities with respect to a total number of files in each backup cycle) larger than a threshold. These backup cycles may be identified by the statistical filtering module 320, and flagged for further investigation.

Example Entropy Scores

Figure 6A:
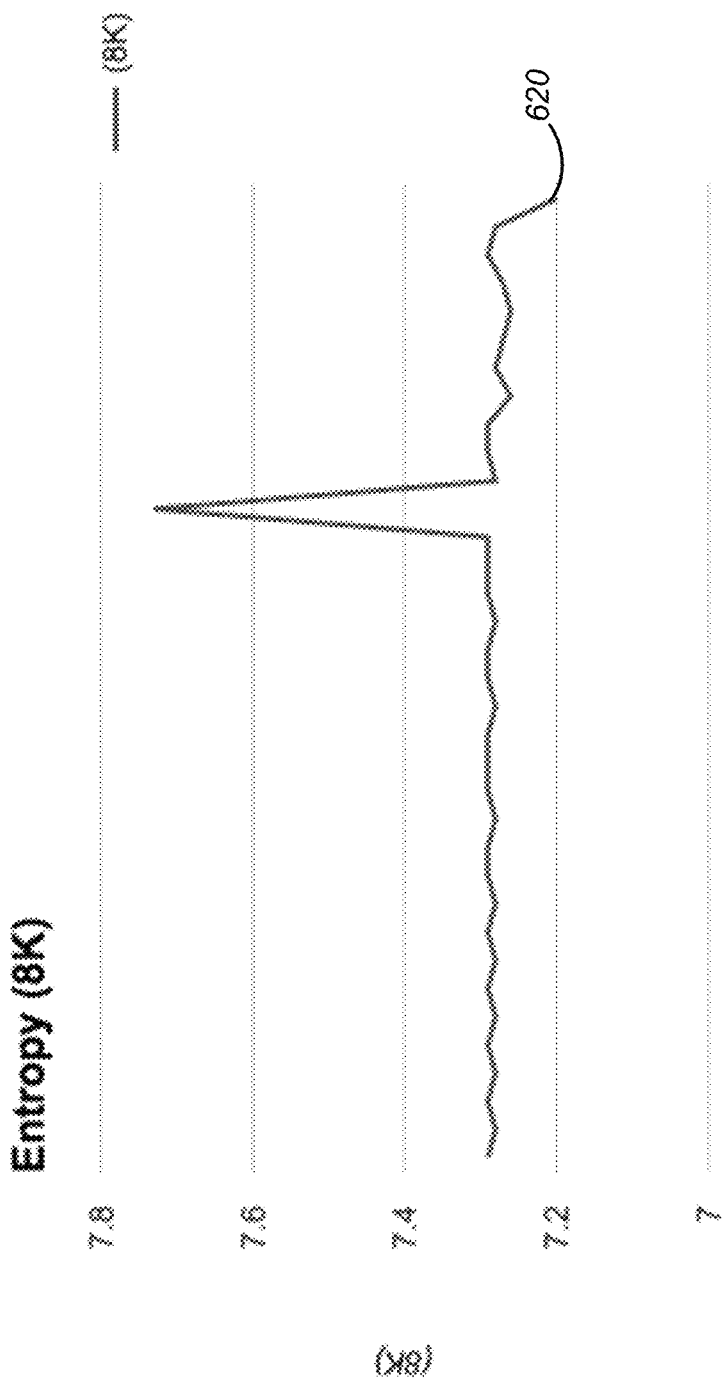
FIG. 6A is an example entropy score computed for an unencrypted file.
Figure 6B:
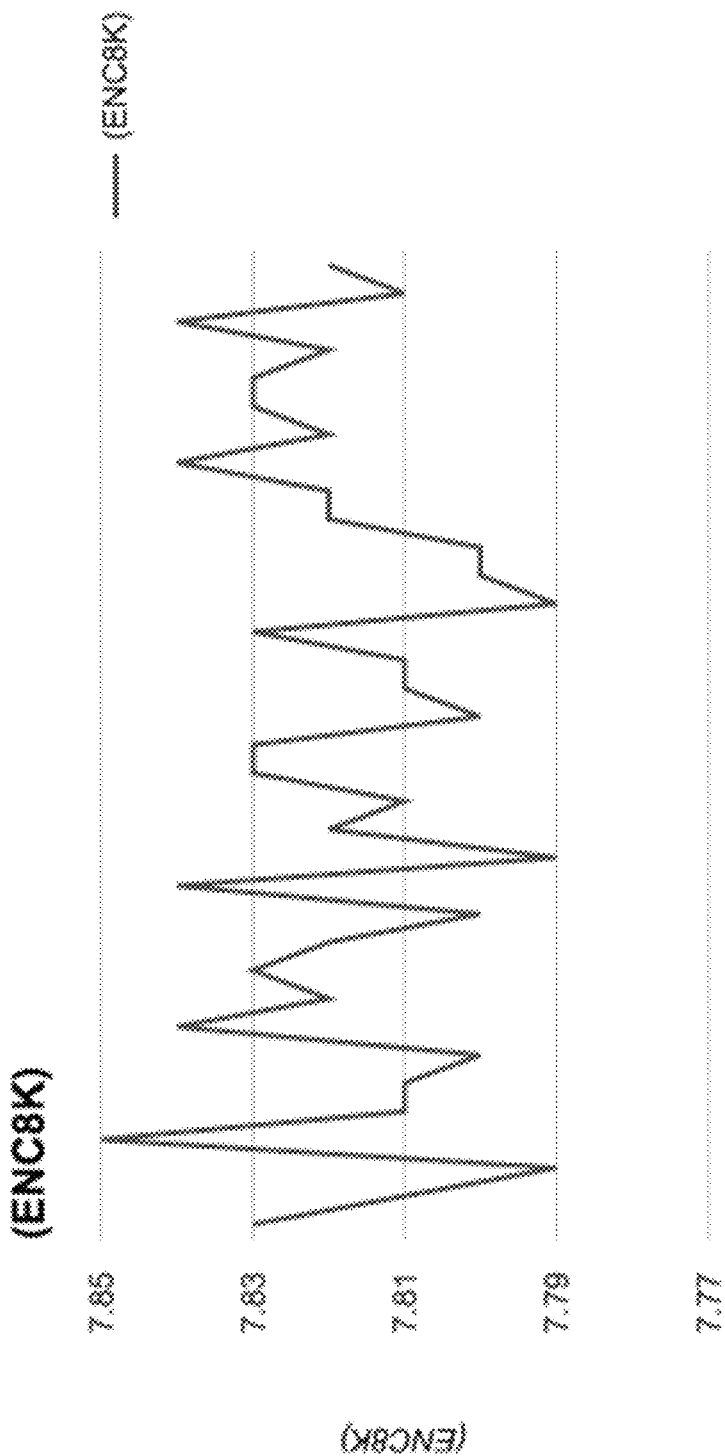
FIG. 6B is an example entropy score computed for an encrypted file.

FIG. 6A is an example entropy score computed for an unencrypted file. FIG. 6B is an example entropy score computed for an encrypted file. As shown in FIG. 6B, an entropy score of an encrypted file is higher than an entropy score of an unencrypted file. Thus, an encrypted file or a potential ransomware may be identified by analyzing the entropy score.

Computing Machine Architecture

Figure 7:
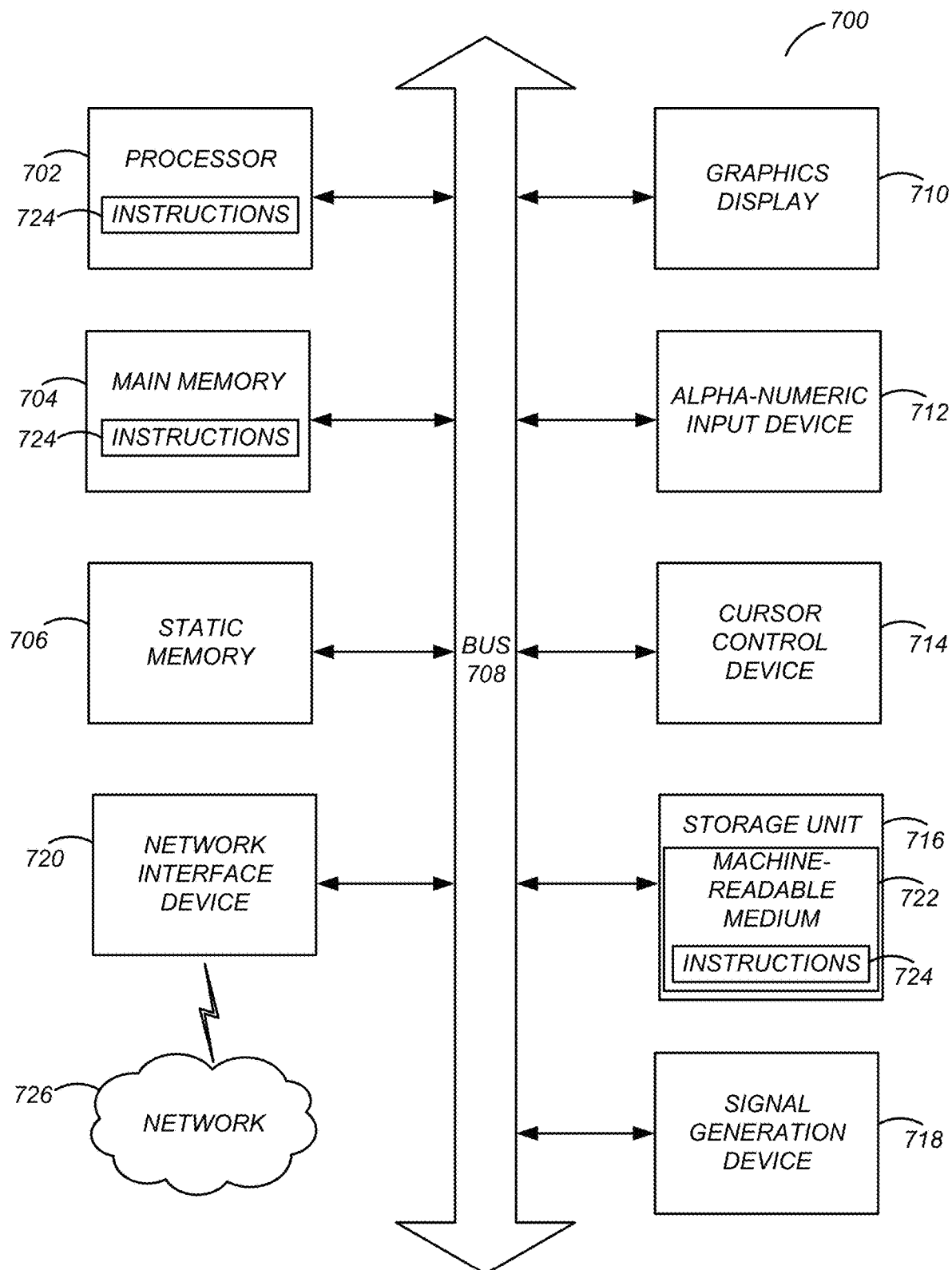
FIG. 7 illustrates components of an example machine able to read instructions from a machine-readable medium and execute them in a processor (or controller) in accordance with an embodiment.

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which instructions 724 (e.g., software or program code) for causing the machine to perform any one or more of the methodologies discussed herein, e.g., with FIGS. 1-6, may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processors (generally, processor 702) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alpha-numeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONFIGURATION CONSIDERATIONS

Beneficially, the two steps approach disclosed herein allows savings in time and resources for detecting ransomwares. In one aspect, by performing the statistical behavior analysis on the backup rather than on a client device, computation resource of the client device can be preserved. In another aspect, by performing the statistical behavior analysis on the backup to filter out portions of the backup with file activities similar to a standard pattern of file activities, the entropy detection can be performed for a much smaller portion of the backup with abnormal file activities. For example, rather than performing the entropy detection on millions of files, the entropy detection can be performed on a selective portion of the backup (e.g., less than one hundred files). Accordingly, ransomwares from a large amount of data (e.g., terabytes) can be detected within a few hours, rather than over several days through a conventional approach of detecting ransomwares.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIG. 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for detecting ransomwares through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system comprising:
   one or more processors; and
   memory configured to store code comprising instructions, the instructions, when executed by the one or more processors, cause the one or more processors to:
   perform a plurality of backup cycles on a client device, each backup cycle corresponding to time period;
   identify a standard pattern of file activities associated with the client device based on the plurality of backup cycles;
   detect an anomaly in a file activity with respect to the client device, the anomaly determined based on deviation from the standard pattern of the file activities;
   generate a notification of the anomaly indicating a potential ransomware attack;
   determine entropy values of a plurality of files in a portion of backup that is associated with the anomaly;
   receive a request to perform a mass restore of the client device; and
   automatically restore one or more files from previous backup cycles based on the entropy values of the files being lower than an entropy threshold, wherein the instruction to automatically restore the one or more files comprises instructions to:
   perform a journal walk for the previous backup cycles to identify files updated or added in one or more restore point;
   obtain, for each identified file, an entropy of a block of the identified file;
   restore, for each block and each identified file, the block responsive to determining the block does not include ransomware.

2. The system of claim 1, wherein the instruction to detect the anomaly comprises instructions to:
   perform a statistical behavior analysis on a portion of a backup based on the standard pattern identified, wherein the statistical behavior analysis comprises:
   in a learning phase generating a distribution of file activities in the plurality of backup cycles; and
   in a prediction phase determining a particular ratio of a particular number of file activities in the portion relative to a total number of activities in files in the portion.

3. The system of claim 2, wherein the standard pattern of file activities is further defined by at least a ratio of a number of the plurality of files modified to the total number of the plurality of files in the portion of the backup.

4. The system of claim 1, wherein the instruction to detect the anomaly comprises instructions to:
   generate, for each of the one or more identified files that is new or modified, an entropy score, the entropy score representing a randomness of a distribution of bits in each of the identified files; and
   determine, for each of the one or more identified files whose entropy score exceeds a threshold, whether header information of the identified file has been changed.

5. The system of claim 1, wherein the instruction to detect the anomaly comprises instructions to:
   generate an anomaly score that indicates a degree of anomaly in the file activity; and
   determine that a portion of a backup corresponds to the anomaly, responsive to the anomaly score exceeding a second threshold.

6. The system of claim 1, wherein the instruction to detect the anomaly comprises instructions to:
   determine whether Multipurpose Internet Mail Extensions information for file changes from initial values.

7. The system of claim 1, wherein the instruction to perform the plurality of backup cycles comprises instructions to:
   create a backup log, the backup log comprises additions, deletions, and/or modifications of the files with respect to each backup cycle.

8. A computer-implemented method, comprising:
   performing a plurality of backup cycles on a client device, each backup cycle corresponding to time period;
   identifying a standard pattern of file activities associated with the client device based on the plurality of backup cycles;
   detecting an anomaly in a file activity with respect to the client device, the anomaly determined based on deviation from the standard pattern of the file activities;
   generating a notification of the anomaly indicating a potential ransomware attack;
   determining entropy values of a plurality of files in a portion of backup that is associated with the anomaly;
   receiving a request to perform a mass restore of the client device; and
   automatically restoring one or more files from previous backup cycles based on the entropy values of the files being lower than an entropy threshold,
   wherein automatically restoring the one or more files comprises:
   performing a journal walk for the previous backup cycles to identify files updated or added in one or more restore point;
   obtaining, for each identified file, an entropy of a block of the identified file;
   restoring, for each block and each identified file, the block responsive to determining the block does not include ransomware.

9. The computer-implemented method of claim 8, wherein detecting the anomaly comprises:
   performing a statistical behavior analysis on a portion of a backup based on the standard pattern identified, wherein the statistical behavior analysis comprises:
   in a learning phase generating a distribution of file activities in the plurality of backup cycles; and
   in a prediction phase determining a particular ratio of a particular number of file activities in the portion relative to a total number of activities in files in the portion.

10. The computer-implemented method of claim 9, wherein the standard pattern of file activities is further defined by at least a ratio of a number of the plurality of files modified to the total number of the plurality of files in the portion of the backup.

11. The computer-implemented method of claim 8, wherein detecting the anomaly comprises:
generating, for each of the one or more identified files that is new or modified, an entropy score, the entropy score representing a randomness of a distribution of bits in each of the identified files; and
determining, for each of the one or more identified files whose entropy score exceeds a threshold, whether header information of the identified file has been changed.

12. The computer-implemented method of claim 8, wherein detecting the anomaly comprises:
generating an anomaly score that indicates a degree of anomaly in the file activity; and
determining that a portion of a backup corresponds to the anomaly, responsive to the anomaly score exceeding a second threshold.

13. The computer-implemented method of claim 8, wherein detecting the anomaly comprises:
determining whether Multipurpose Internet Mail Extensions information for file changes from initial values.

14. The computer-implemented method of claim 8, wherein performing the plurality of backup cycles comprises:
creating a backup log, the backup log comprises additions, deletions, and/or modifications of the files with respect to each backup cycle.

15. A non-transitory computer readable medium configured to store code comprising instructions, the instructions, when executed by one or more processors, cause the one or more processors to:
perform a plurality of backup cycles on a client device, each backup cycle corresponding to time period;
identify a standard pattern of file activities associated with the client device based on the plurality of backup cycles;
detect an anomaly in a file activity with respect to the client device, the anomaly determined based on deviation from the standard pattern of the file activities;
generate a notification of the anomaly indicating a potential ransomware attack;
determine entropy values of a plurality of files in a portion of backup that is associated with the anomaly;
receive a request to perform a mass restore of the client device; and
automatically restore one or more files from previous backup cycles based on the entropy values of the files being lower than an entropy threshold,
wherein the instruction to automatically restore the one or more files comprises instructions to:
perform a journal walk for the previous backup cycles to identify files updated or added in one or more restore point;
obtain, for each identified file, an entropy of a block of the identified file;
restore, for each block and each identified file, the block responsive to determining the block does not include ransomware.

16. The non-transitory computer readable medium of claim 15, wherein the instruction to detect the anomaly comprises instructions to:
perform a statistical behavior analysis on a portion of a backup based on the standard pattern identified, wherein the statistical behavior analysis comprises:
in a learning phase generating a distribution of file activities in the plurality of backup cycles; and
in a prediction phase determining a particular ratio of a particular number of file activities in the portion relative to a total number of activities in files in the portion.

17. The non-transitory computer readable medium of claim 16, wherein the standard pattern of file activities is further defined by at least a ratio of a number of the plurality of files modified to the total number of the plurality of files in the portion of the backup.

18. The non-transitory computer readable medium of claim 15, wherein the instruction to detect the anomaly comprises instructions to:
generate, for each of the one or more identified files that is new or modified, an entropy score, the entropy score representing a randomness of a distribution of bits in each of the identified files; and
determine, for each of the one or more identified files whose entropy score exceeds a threshold, whether header information of the identified file has been changed.

19. The non-transitory computer readable medium of claim 15, wherein the instruction to detect the anomaly comprises instructions to:
determine whether Multipurpose Internet Mail Extensions information for file changes from initial values.

20. The non-transitory computer readable medium of claim 15, wherein the instruction to perform the plurality of backup cycles comprises instructions to:
create a backup log, the backup log comprises additions, deletions, and/or modifications of the files with respect to each backup cycle.

* * * * *